(12) United States Patent
Marocco

(10) Patent No.: US 8,539,645 B2
(45) Date of Patent: Sep. 24, 2013

(54) CORD LOCK GUIDE FOR BLINDS

(75) Inventor: Mario M. Marocco, Toronto (CA)

(73) Assignee: Maxxmar Inc., Toronto, Ontario (CA)

( * ) Notice: Subject to any disclaimer, the term of this patent is extended or adjusted under 35 U.S.C. 154(b) by 157 days.

(21) Appl. No.: 13/067,062

(22) Filed: May 5, 2011

(65) Prior Publication Data
US 2012/0279021 A1 Nov. 8, 2012

(51) Int. Cl.
*A47H 3/02* (2006.01)
*E06B 9/326* (2006.01)
*A47H 3/08* (2006.01)

(52) U.S. Cl.
USPC ..... 24/136 K; 24/115 F; 24/115 R; 24/136 R; 24/136 L; 160/178.1 R; 160/178.2

(58) Field of Classification Search
None
See application file for complete search history.

(56) References Cited

U.S. PATENT DOCUMENTS

| | | | | | |
|---|---|---|---|---|---|
| 1,333,375 | A | * | 3/1920 | Bauer et al. | 24/136 A |
| 3,337,682 | A | * | 8/1967 | Swett | 174/135 |
| 4,288,891 | A | * | 9/1981 | Boden | 24/115 G |
| 4,328,605 | A | * | 5/1982 | Hutchison et al. | 24/115 G |
| 4,453,292 | A | * | 6/1984 | Bakker | 24/115 G |
| 4,622,723 | A | * | 11/1986 | Krauss | 24/115 G |
| 4,656,698 | A | * | 4/1987 | Arakawa | 24/136 A |
| 5,197,166 | A | * | 3/1993 | Meier et al. | 24/115 G |
| 5,560,414 | A | * | 10/1996 | Judkins et al. | 160/178.1 R |
| 5,577,543 | A | * | 11/1996 | Jelic | 160/178.1 R |
| 5,649,340 | A | * | 7/1997 | Ida | 24/115 G |
| 5,752,558 | A | * | 5/1998 | Lin | 160/320 |
| 5,791,022 | A | * | 8/1998 | Bohman | 24/130 |
| 5,845,696 | A | * | 12/1998 | Chou | 160/178.1 V |
| 5,894,639 | A | * | 4/1999 | Boden et al. | 24/115 G |
| 6,792,999 | B2 | * | 9/2004 | Cross et al. | 160/321 |
| 6,808,349 | B1 | * | 10/2004 | Boling | 411/339 |
| 7,108,038 | B2 | * | 9/2006 | Welfonder | 160/84.06 |
| 7,114,544 | B2 | * | 10/2006 | Rice et al. | 160/178.1 V |
| 7,299,851 | B2 | * | 11/2007 | Dekker | 160/178.1 R |
| 7,331,371 | B1 | * | 2/2008 | Kovach et al. | 160/178.1 R |
| 2008/0000054 | A1 | * | 1/2008 | Huang | 24/115 F |

\* cited by examiner

*Primary Examiner* — Robert J Sandy
*Assistant Examiner* — David Upchurch

(57) ABSTRACT

A cord lock guide for a blind operated by a blind cord, wherein the cord hangs in a loop from a blind head rail, and having a main body portion, formed of front and back panels, and junction portions extending between the front and the back panels, a cord passage defined between the front and back panels, a movable guide body between the front and back panels, a generally semi-arcuate cord guide surface defined by the guide body around which the cord may run, a guide body support extending from the guide body, a hollow sleeve secured between the front and back panels; and receiving the guide body support therein, a resilient member between the guide body and the sleeve, the guide body being movable towards the sleeve against the resilient member and, a cord abutment located between the front and back panels, and oriented so as to obstruct the cord from passing around the guide body, when the guide body is in a first position, and the abutment being out of obstructive engagement when the guide body is moved against the resilient member.

7 Claims, 7 Drawing Sheets

CORD LOCK GUIDE FOR BLINDS

FIELD OF THE INVENTION

The invention relates to a cord lock guide for blinds, and in particular to blinds with slats, either horizontal Venetian blinds, or vertical slat blinds, of the type in which the slats are rotated between open and closed positions, or are raised and lowered, or are drawn aside, or closed by control filaments, which hang down in a loop, at one side or end of the blind.

BACKGROUND OF THE INVENTION

Blinds of these types, which have control filaments, either cords or chains, hanging in loops, have been in use for many years. The slats may be rotated between closed or open positions, and may be raised or lowered, or drawn aside or closed, by the operation of such filaments. Cords or chains of this type are herein referred to as cords as being generic to such filament controls.

It is well known that such cord loops can become tangled and difficult to operate.

In some cases such cord loops have actually been the cause of accidents.

To overcome these problems it has become usual to provide guide blocks for controlling such cords. Such blocks may incorporate a rotatable pulley in some cases, or may simply provide a grooved block around which the cord will slide.

This has to some extent eased the problem of tangling of the cords. However it does not deal with the possible hazards presented by such looped cords.

Another improvement has been the provision of some form of attachment for securing the guide block to the building fabric. Usually this attachment was simply a screw which could be secured to a wall alongside the blind.

When this was done, the cord no longer hung in a free loop. Instead the cord was forced to pass around a fixed path, defined by the guide block secured to the wall. However, it has been found that even when this improvement was provided, this feature of securing the guide block in position, was not always used. For example, where a blind is purchased by a home owner, and installed by him in the home, it was by no means certain that he would follow the directions. As is known many persons do not even read the directions. Consequently in many cases the guide block was simply left unattached.

This could also happen even where the blind was installed by a professional. He might no be familiar with that particular blind. He might fail to insert the screw. Or the screw might pull out.

For all of these reasons it is desirable to provide a blind with a guide block for the cord loop, which guide block has an automatic cord locking mechanism built in, so that if the guide block is loose for any reason, the blind will jam.

BRIEF SUMMARY OF THE INVENTION

With a view to achieving the foregoing advantages, the invention provides a cord lock guide for a blind cord, and having a guide block having a main body portion, comprising front and back panels, and a junction portion extending between the front and the back panels, a cord passage defined between the front and back panels, a generally arcuate curved guide body between said front and back panels, said guide body defining a generally semi-arcuate surface around which said cord may run, a body support extending from said body, and connecting with a portion of said spacer, and a resilient member between said arcuate guide body and said spacer, said guide body being movable towards and away from said spacer against said resilient member, and at least one cord abutment located between said front and back panels, and oriented so as to obstruct said cord from passing around said guide body, when said guide body is in the first position, and said abutment being out of obstructive engagement when said guide body is moved against said resilient member.

Preferably the invention further provides such a guide block wherein the guide body is moveable in response to a spring, to engage the cord with the abutment.

Preferably the invention further provides such a guide block wherein V-shaped notches are formed in the guide block to further secure the cord against incorrect usage. Preferably the invention further provides such a guide block wherein the guide body includes a stem, and wherein the spring is received on the stem.

Preferably the invention further provides such a guide block wherein a sleeve is located in the guide block which receives the stem and the spring.

Preferably the invention further provides such a guide block wherein the guide body is provided with a semi-annular guide groove for guiding the cord.

Preferably the invention further provides such a guide block wherein the guide body is formed with wings to assist in preventing twisting of the guide body within the guide block.

As an added feature the invention provides an attachment clip, by means of which the guide block may be adapted to be secured to a wall, beside a window opening.

The various features of novelty which characterize the invention are pointed out with more particularity in the claims annexed to and forming a part of this disclosure.

For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
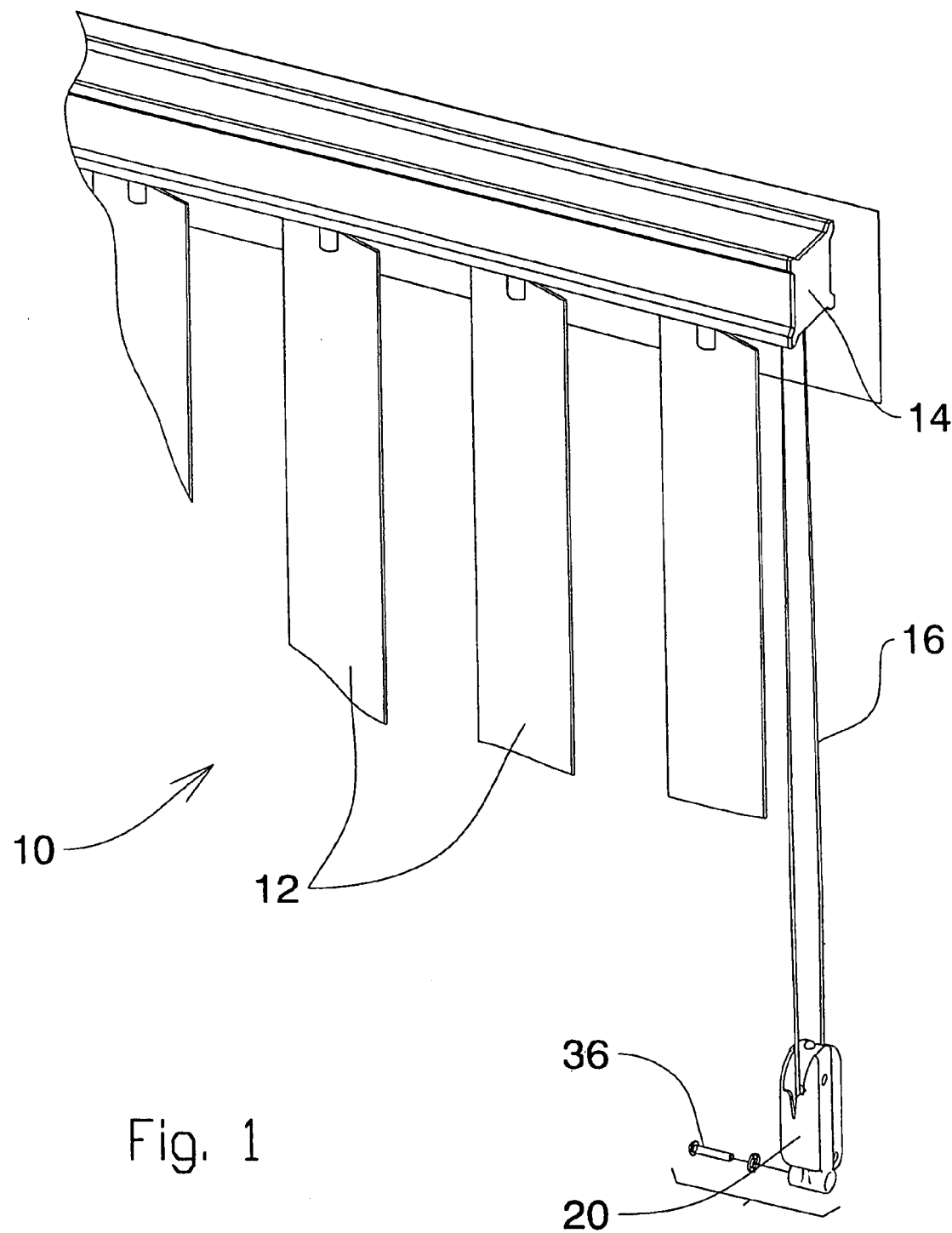
FIG. 1 is a general perspective of a blind with an operating cord, in a loop and showing a guide block on the cord.
Figure 2:
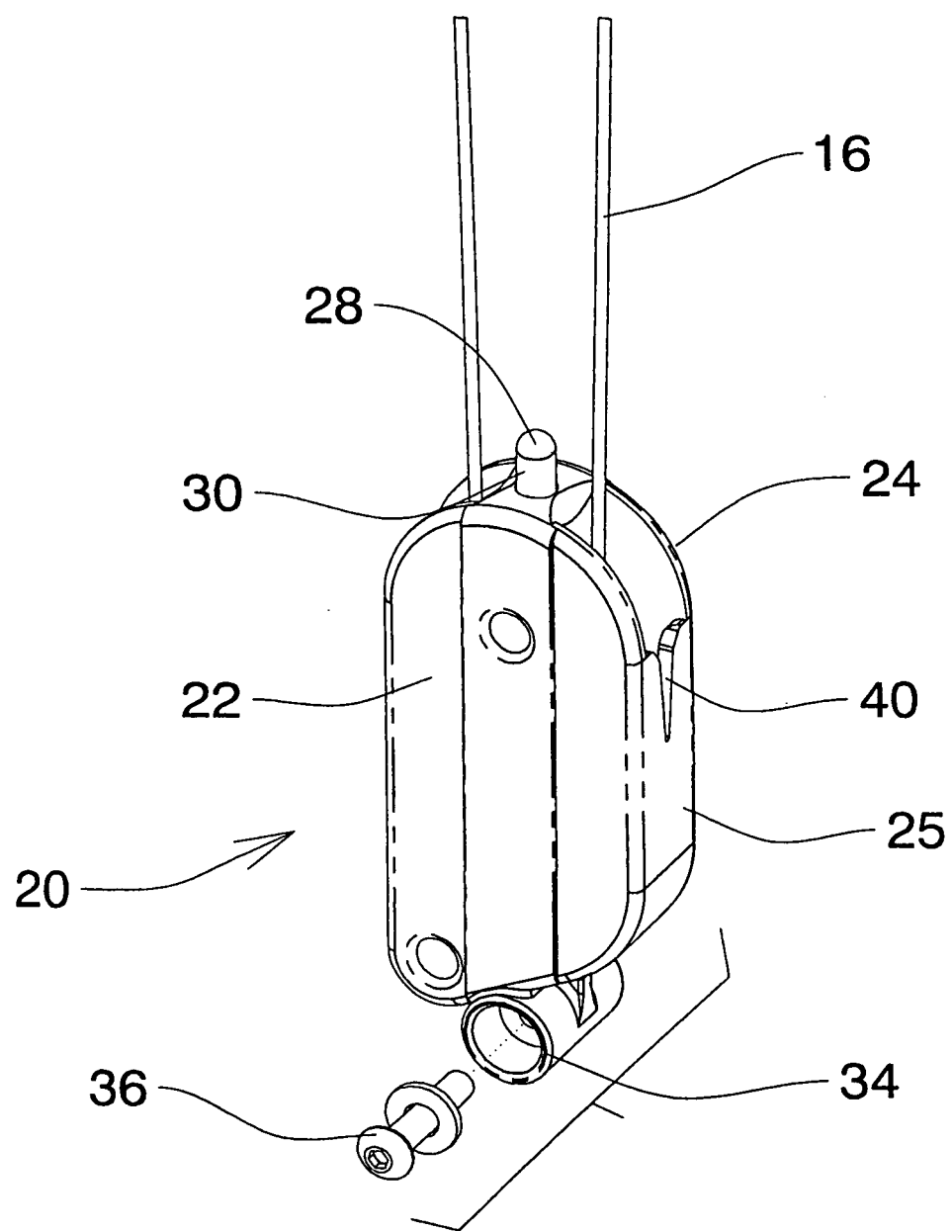
FIG. 2 is a partially exploded perspective of the cord guide block.
Figure 3:
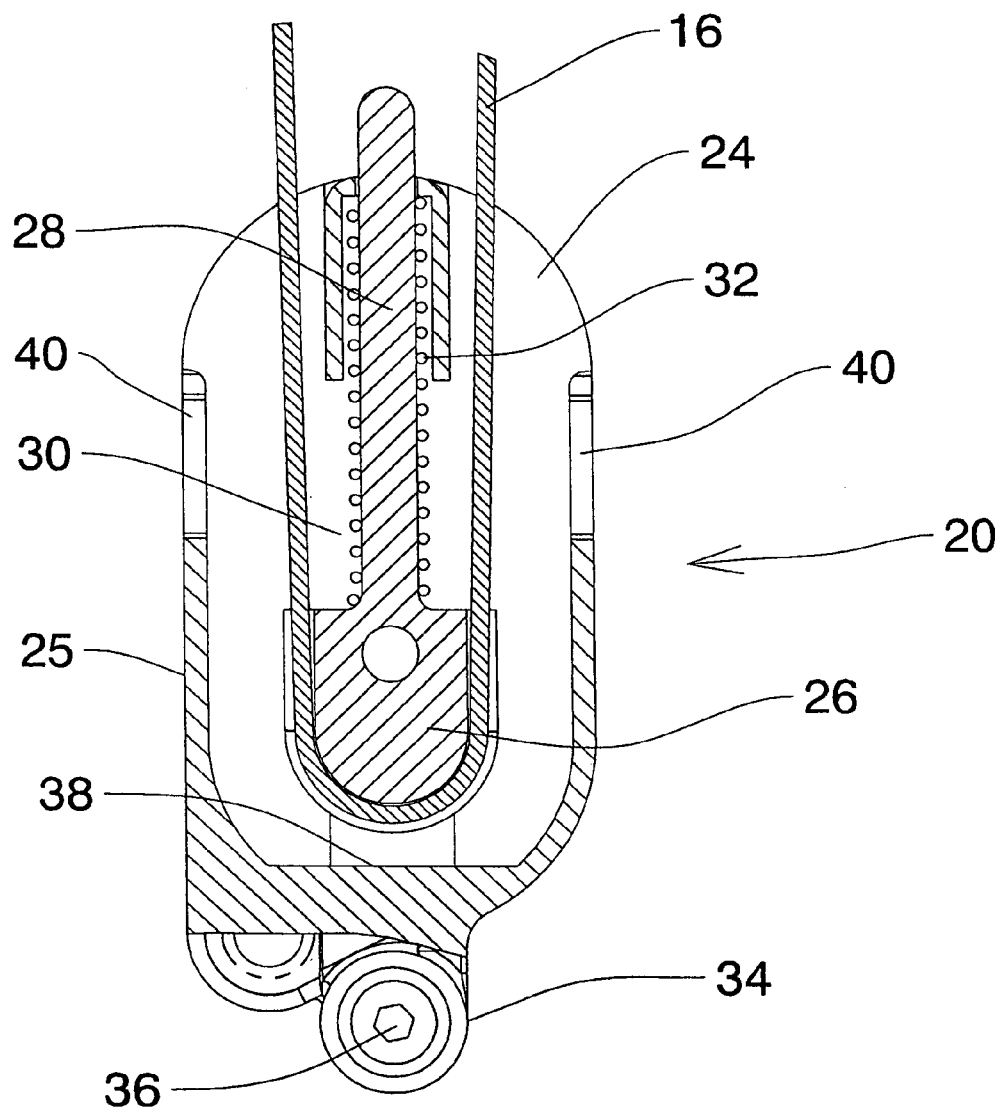
FIG. 3 is a section along the line of 3-3 of FIG. 2, showing the guide body moved against said resilient member, to permit free running of the cord.
Figure 4:
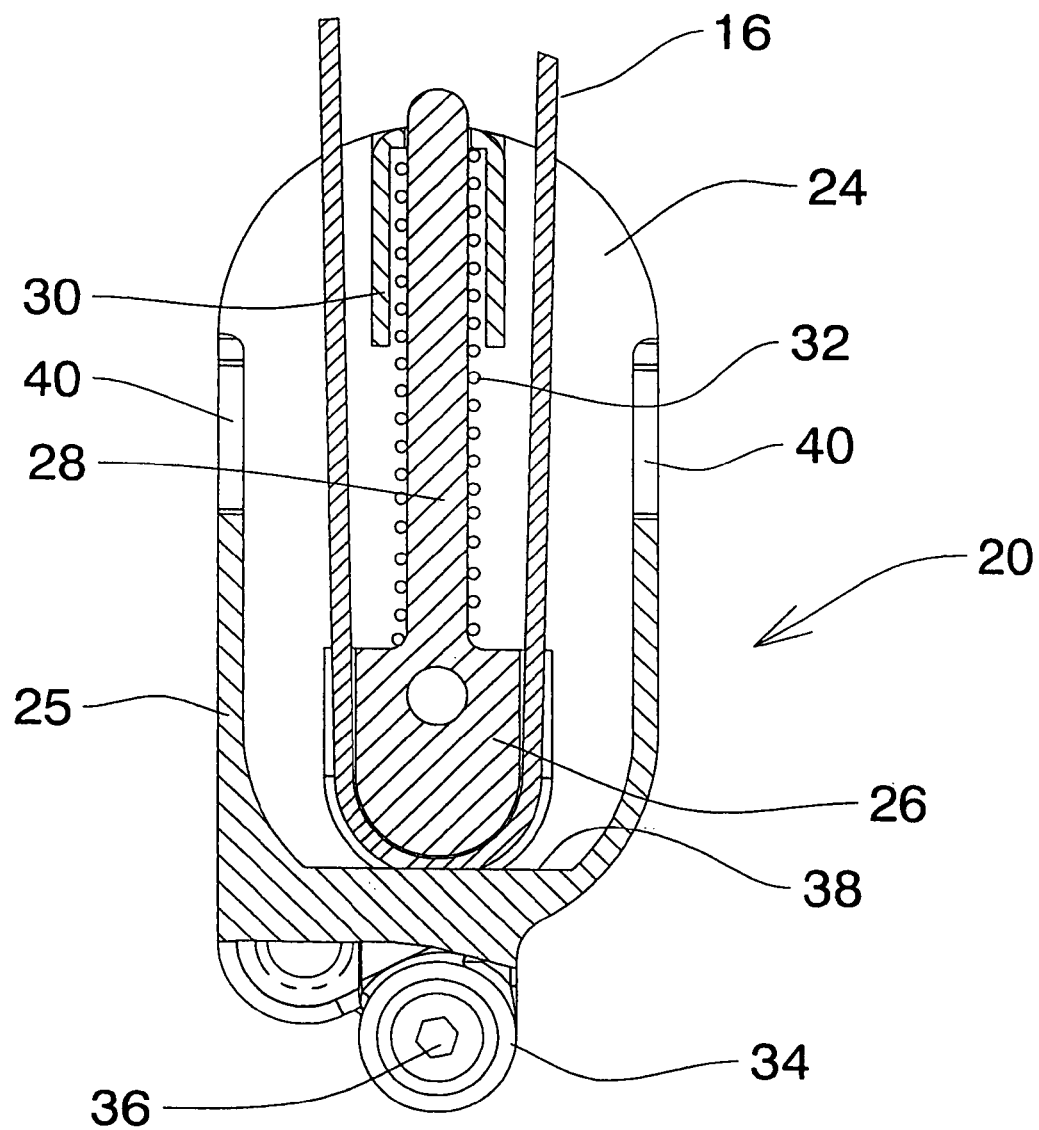
FIG. 4 is a section along the line 3-3 of FIG. 2, corresponding to FIG. 3, but showing the guide body extended by said resilient member, and said abutments obstructing the cord.

As shown in FIG. 1 the invention finds its application in connection with typical blind assemblies, such as blind (10). Blinds of various types of material and construction, both fabric blinds and slat type blinds, are frequently operated by cords. In this case the blind slats (12) hang from a head rail (14), and the slats (12) may be either rotated closed or open.

The slats (12) may also be drawn to one end of the head rail.

These functions are well known and require not further description.

The invention also has application in connection with Venetian blinds, in which the slats are horizontal and supported on cords or tapes.

Such slats can be rotated open or closed, and can be drawn up into the head rail. Such blinds are believed to be well known in the art and require no further illustration.

In blinds, both verticals and Venetians, is it usual to provide control cords (16), at one end on the head rail. Operation of the cords can control both opening and closing and also drawing, of the slats, as desired.

Usually there are two sets of cords, one for one function, and another for the other. However in FIG. 1 only one set of cords (16) is shown for the sake of simplicity.

As explained above, the control cord (16) usually hangs in a loop, as shown.

It sometimes becomes entangled. It may become caught in some other article, and in some cases it may create a hazard.

For this reason it is desirable to provide a guide block (20), through which the looped cord (16) runs. The guide block is preferably secured to the window frame or building in some way. In this way the looped cord (16) is controlled and does not create any problems.

However it is known that such attachment may become loosened.

The guide block (20) may become free. In some cases it is known that the guide block is never attached to the building or window frame, for whatever reason, when the blind is installed.

The invention is directed to the provision of guide block (20) with a back up safety feature, to alert the user to the fact that the guide block is loose, or misplaced.

For this purpose, the invention provides, in a first embodiment (FIGS. 2 to 5), a guide block (20) having body formed as a front panel (22), a back panel (24) and side edge portions (25) along each side of block (20), joining the front and back panels. The edge portions (25) are spaced apart at their upper ends to define side passages to permit the control cord (16) to pass from guide block (20), along each side thereof. The front and back panels are spaced apart from one another and define a hollow interior guide path. wide enough to admit a control cord (16) to pass freely therebetween.

In order to provide a smooth running pathway for the control cord (16), a movable guide body (26) is provided with an integral with an elongated stem rod (28) Stem rod (28) is received in and slides within a hollow sleeve (30). Sleeve (30) is secured between front panel (22) and back panel (24). A resilient member or spring (32) fits around stem rod (28), and is received within hollow sleeve (30).

Spring (32) urges guide body (26) away from sleeve (30), and spring (32) is compressible to permit body (26) to move with stem rod (28) sliding into sleeve (30).

A fastening recess (34) is moulded integrally with one or both of the front or back panels, and can receive a fastening device (36) for securing the guide block in a desired location.

A cord abutment (38) is formed within guide block (20), between the front and back panel, for purposes described below.

When the guide block (20) is installed correctly, the guide block (20) will be pulled downwardly and the control cord (16) will move guide body (26) and stem rod (28), compressing spring (32). The fastening device (36) with then be installed, with the device (36) passing through recess (34), and into the building fabric or window frame, holding the guide block in that position.

In this position (FIG. 3) the cord will have been drawn away from the abutment (38), and this will leave the cord free to run around guide body (26).

However if the fastening device comes loose, or if it is not installed at all, then the spring (32) will not be compressed.

In this position (FIG. 4), the guide body (26) will have been extended away from sleeve (30).

Body (26) will thus press the cord (16) against the abutment (38).

If the user then attempts to operate the cord, the guide block will move upwardly and eventually become jammed against the head rail. The cord will not run free.

The guide block will grip the cord and will be raised up.

This will prevent operation of the blind.

The user will then realise that something must be done and either call for a service man or deal with the problem himself.

Figure 5:
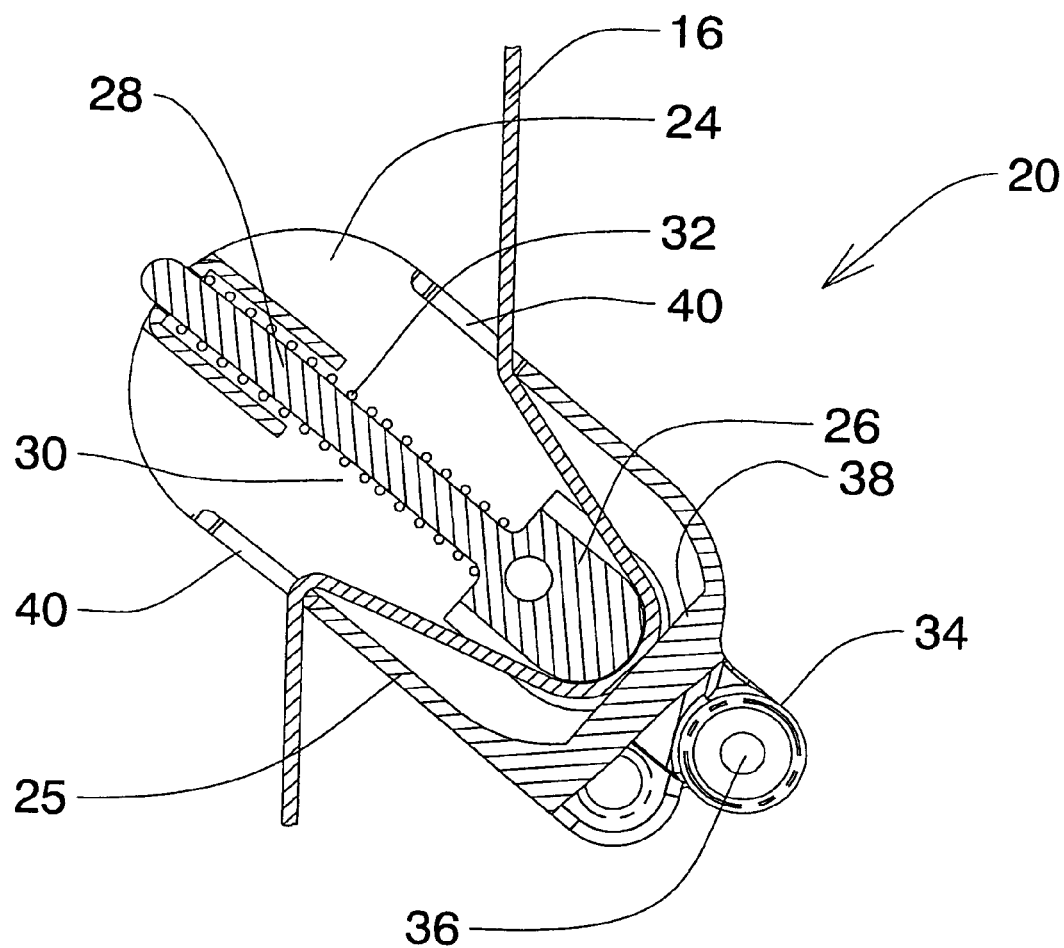
FIG. 5 is a section corresponding to FIGS. 2 and 3, and showing the guide body tilted to one side.

In order to provide still further security, the edge portions (25) between the front and back panels (22) and (24) may be formed with V-shaped, wedging notches (40). These notches function as shown in FIG. 5. The block may tilt to one side or the other, one side tilt being shown for illustrative purposes.

It will be appreciated that the lower portion of guide block defines a mass, the weight of which, in normal use, will cause the guide block to hang substantially upright.

When the guide block is secured as described, then the guide block will remain substantially upright, even when the cord is operated.

However if the fastening device is loose, or missing, then the guide block will hang loose. If the cord is then operated, then because the cord is jammed, by the abutment, the guide block (20) will tilt over, to one side or the other.

The cord will then become wedged in one or other of the V-shaped wedging notches, adding still further obstruction to the operation of the cord.

Figure 6:
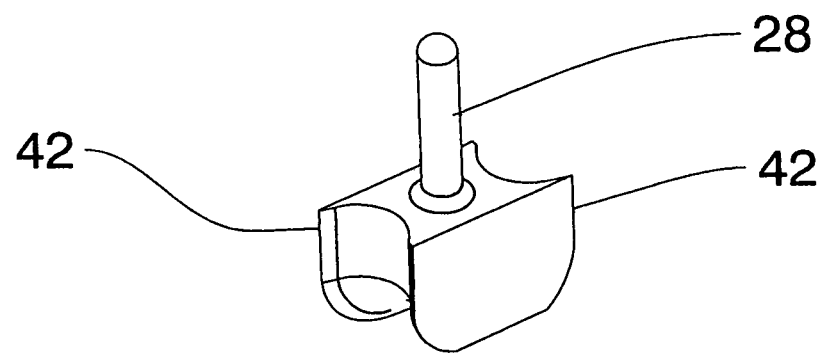
FIG. 6 is a cut away perspective of a further embodiment of the guide block.

Guide body (26) will preferably have front and back guide wings (42), (FIG. 6.)

These will function to keep the body (26) from twisting around between the front and back panels (22) and (24).

As examined above, when installed correctly, the guide block is secured to the building fabric, for example by screw (36). In this case the cord loop is controlled, and at the same time the cord is not gripped by the abutment but is free to run around the cord guide.

Usually the cords (16) hang beside the end of the blind, and in this position the guide block is twisted around so that the hole 34 is directed along an axis parallel to the head rail.

Assuming the is a window frame (not shown) then it is a simple matter to secure the screw through the hole into the frame.

However, in some cases there is no frame, or the frame is inadequate.

In these cases the guide block must be secured to the actual wall of the building. However, due to the orientation of the guide block, this form of attachment would require twisting the guide block 90 Degs. This would then create confusion in the operation of the cord (16).

Figure 7:
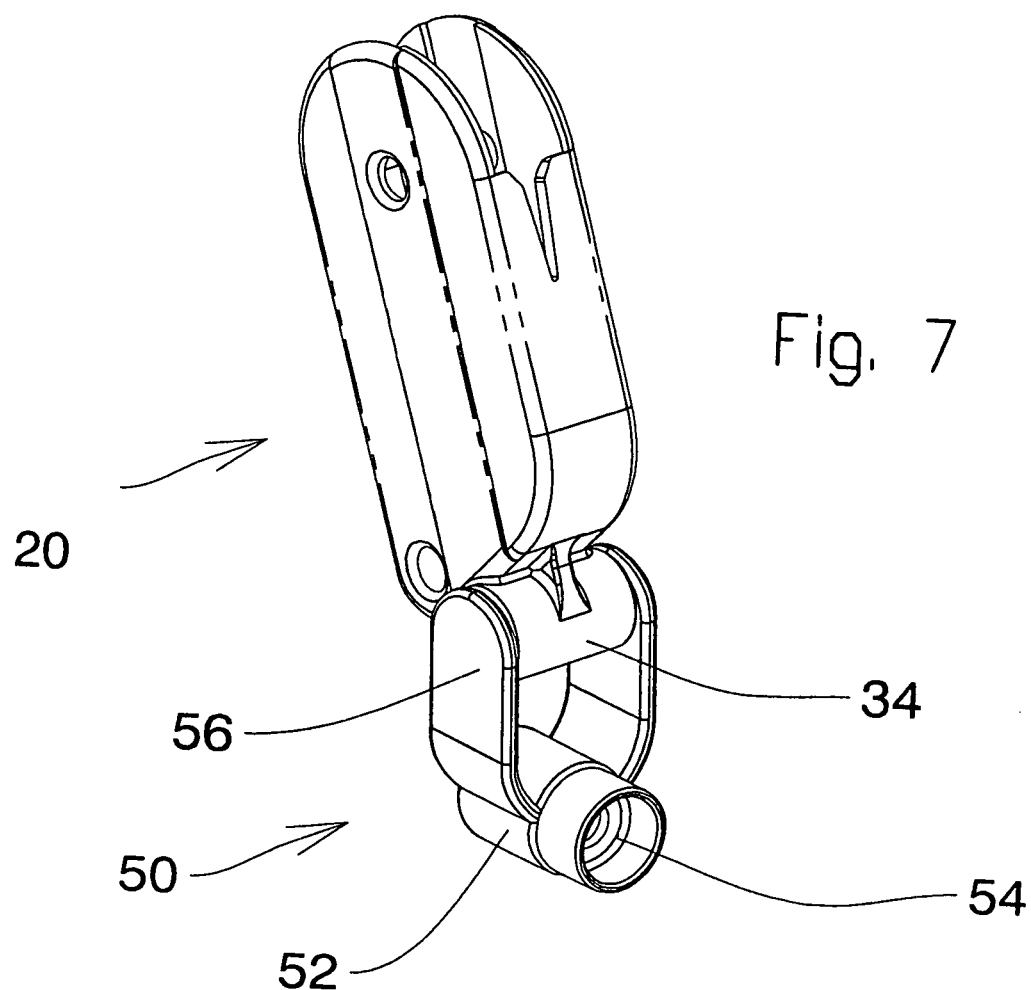
FIG. 7 is a perspective of a guide block which an attachment clip.
Figure 8:
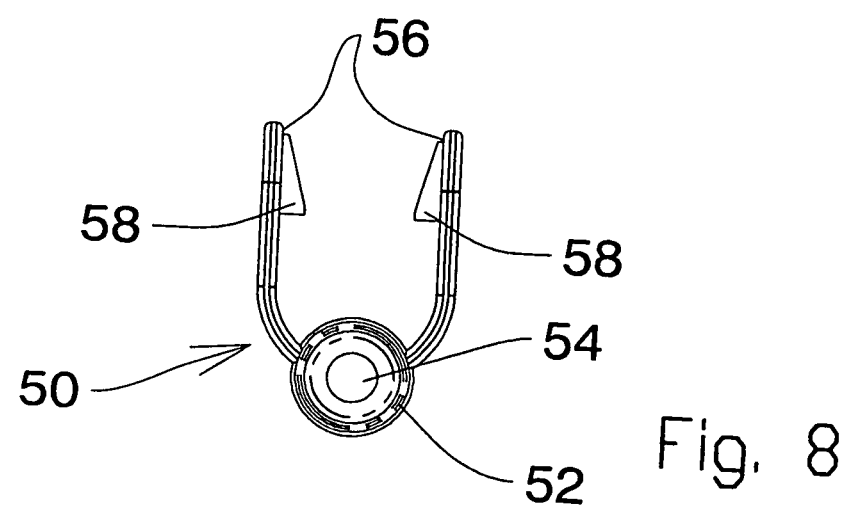
FIG. 8 is a section along line 8-8 of FIG. 7

To deal with this there is provided an attachment clip (50) FIGS. 7 and 8.

Clip (50) has a body (52) with a screw hole (54). Two resilient arms (56) extend from body (52).

The arms are located in a plane rotated 90 degs to the axis of hole (54).

The arms have claws (58). The arms can be sprung apart and the claws (58) will snap into hole (34) in guide block (20). The screw can then be passed through hole (54) and into a wall. The guide block will remain in its correct orientation for the cords (16) as shown in FIG. 1

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A cord lock guide for a blind operated by a blind cord, wherein the cord hangs in a loop from a blind head rail, and comprising;
    a main guide block portion, formed of front and back panels, and side edge portions extending between the front and the back panels;
    a cord passage defined between the front and back panels, and said passage extending between said side edge portions through which said cord passes;
    V shaped wedging notches defined by respective said side edge portions
    a movable guide body between said front and back panels;
    a generally semi-arcuate cord guide surface defined by said guide body around which said cord may run;
    a guide body support extending from said guide body;
    a hollow sleeve between said front and back panels; and receiving said guide body support therein;
    a resilient member between said guide body and said sleeve, said guide body being movable between first and second positions towards and away from said sleeve against said resilient member; and,
    a cord abutment located between said front and back panels, and oriented so as to obstruct said cord from passing around said guide body, when said guide body is in the first position, thereby tilting said guide body, and wedging said cord in a said V shaped wedging notch, and said abutment being out of obstructive engagement when said guide body is moved against said resilient member.

2. A cord lock guide as claimed in claim 1 wherein said resilient member is a spring and wherein said guide body is moveable in response to the spring, to engage the cord with the abutment.

3. A cord lock guide as claimed in claim 2 wherein the guide body support includes a stem, and wherein the spring is received on the stem.

4. A cord lock guide as claimed in claim 3 wherein said sleeve is located in the guide block and receives the stem and the spring.

5. A cord lock guide as claimed in claim 4 wherein the guide body defines a semi-annular cord guide groove for guiding the cord.

6. A cord lock guide as claimed in claim 5 wherein the guide body defines wings to assist in preventing twisting of the guide body within the guide block.

7. A cord lock guide as claimed in claim 1 and including an attachment clip having a screw hole, and resilient arms, the arms being engageable with the guide block.

* * * * *